United States Patent [19]

Iwata et al.

[11] Patent Number: 4,578,783
[45] Date of Patent: Mar. 25, 1986

[54] ULTRASONIC DISTANCE MEASURING APPARATUS

[75] Inventors: Hiroshi Iwata, Nara; Hiroshi Makino, Hirakata, both of Japan

[73] Assignee: West Electric Co., Ltd., Osaka, Japan

[21] Appl. No.: 488,166

[22] Filed: Apr. 25, 1983

[30] Foreign Application Priority Data

Apr. 28, 1982 [JP]  Japan .................................. 57-71811

[51] Int. Cl.⁴ ............................................. G01S 7/66
[52] U.S. Cl. ...................................... 367/99; 367/138
[58] Field of Search .................... 367/87, 99, 137, 138, 367/903; 181/142; 73/632, 642

[56] References Cited

U.S. PATENT DOCUMENTS 3,992,692  11/1976  Filer ..................................... 367/137
4,271,705   6/1981  Crostack ........................... 73/642 X

FOREIGN PATENT DOCUMENTS 0065428  4/1983  Japan ................................... 367/137

Primary Examiner—Richard A. Farley
Attorney, Agent, or Firm—Stevens, Davis, Miller & Mosher

[57] ABSTRACT

Undesirable or unpleasant audible sound otherwise generated in a conventional distance measuring apparatus is removed or minimized by controlling the waveform of a burst signal supplied to an ultrasonic transducer so that it has a substantially trapezoidal waveform changing in level with time at rise and/or fall portions thereof.

3 Claims, 5 Drawing Figures

ULTRASONIC DISTANCE MEASURING APPARATUS

The present invention relates to an ultrasonic distance measuring apparatus used for automatic focussing in an image pickup device such as a movie or video camera capable of recording an image and a sound at the same time, more in particular to an ultrasonic distance measuring apparatus in which an unpleasant or uncomfortable audible sound generated on the transmission of the ultrasonic wave is reduced or alleviated by shaping the waveform of the burst signal supplied to an ultrasonic transducer into a substantially trapezoidal waveform with the level of the rise and fall thereof changing with time.

Auto focussing cameras are known in the art, one being produced by the Polaroid Corp., which use an ultrasonic distance measuring means. The ultrasonic wave oscillator of the camera is so constructed that a thin film is impressed with an electric field for transmission and reception of an ultrasonic wave. The fact that a high voltage is applied instantaneously during the transmission of an ultrasonic wave results in the production of a comparatively large instantaneous audible sound.

The audible sound poses no problem to indepedent distance measuring operations of a still camera or the like in which the ultrasonic wave is transmitted or received each time or several times when taking a picture of an object.

In the case where such an ultrasonic distance measuring apparatus is used with a television camera or an 8-mm camera, however, the above-mentioned audible sound is generated continuously due to the fact that the distance measurements are required to be performed continuously.

When the camera is capable of sound recording the audible sound is also undesirably recorded through a microphone at the time of recording a desired sound.

On the other hand, the recent trend of television cameras and 8-mm cameras equipped with a high-magnification zoom lens has made it necessary to reduce the angle of view for distance measurement, with the result that the transmission angle of view of the ultrasonic transducer element is considerably reduced and the audible sound is transmitted to the object with a sharp directivity characteristic.

Consequently, when such television cameras are pointed at certain people as a target they feel uncomfortable with the continuous ultrasonic wave superimposed by an audible sound impulse.

Accordingly, it is the object of the present invention to provide an ultrasonic wave distance measuring apparatus comprising waveform shaping means by which the waveform of the burst signal supplied to an ultrasonic sensor (transducer) for transmitting an ultrasonic wave is shaped into a substantially trapezoidal form with the rise and fall characteristics thereof changing in level with time, thereby alleviating or removing the audible sound generated at the time of an ultrasonic wave transmission.

Additional objects, advantages and features of the present invention, which provides an ultrasonic distance measuring apparatus or ultrasonic range finder, will be apparent from the following detailed description taken in conjunction with the accompanying drawings, in which.

Figure 1:
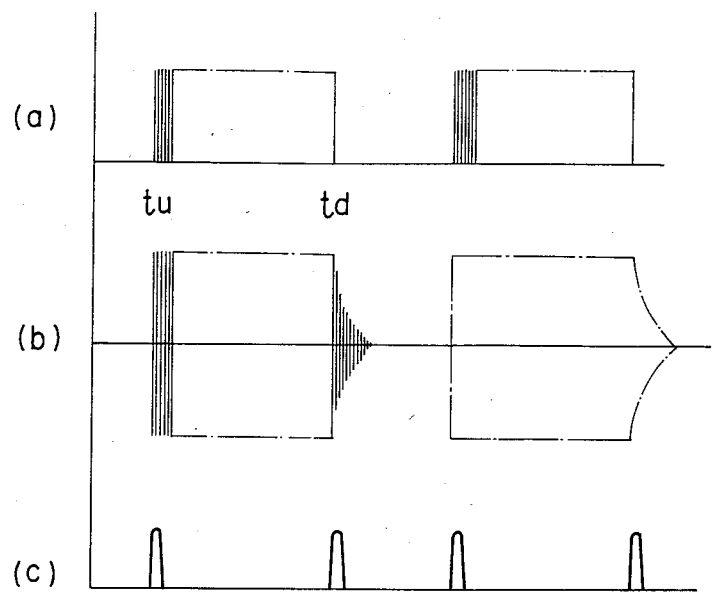
FIG. 1 is a waveform diagram showing the relation between a burst signal supplied, the ultrasonic wave and audible sound generated in a conventional ultrasonic distance measuring apparatus.

It is experimentally confirmed that when a burst signal (a) as shown in FIG. 1 is applied to a thin film or ceramics of the above-mentioned ultrasonic sensor, a rapid change of the rise tu and fall td portions of the signal causes stress to be exerted instantaneously on the thin film or ceramics of the resonator, so that the ultrasonic wave (b) and the audible sound wave (c) are generated at the same time as shown in FIG. 1.

In order to reduce or remove the audible sound generated under this condition, the thin film or ceramics forming a resonator must be impressed with a burst signal causing no sharp stress or one which is free of such a rapid change. This object is achieved by constructing a circuit for generating a burst signal having a rise and fall time as shown by tu' and td' in FIG. 2.

Figure 2:
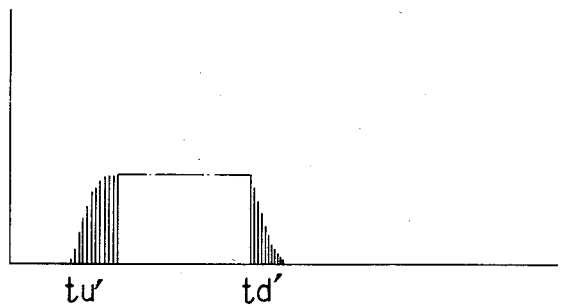
FIG. 2 shows a waveform of a burst signal by which the audible sound is capable of being reduced.

Specifically, experiments conducted by the inventors show that audible sounds are generated differently depending on the manner of controlling the waveforms of the rise and fall portions of the burst signal, that is, the portions tu, tu' and td, td' shown in FIGS. 1 and 2.

In this connection, it has been found that much less audible sound is generated when the waveform of the burst signal takes a transient curve of very gentle linear characteristic at the rise point tu and the fall point td (as shown by dashed lines B and B' of FIG. 3) obtained by a Miller integrator circuit or the like than when the waveform of the burst signal assumes a transient curve (as shown by solid lines A-A' in FIG. 3) obtained by a simple integrator circuit merely comprising a resistor and a capacitor.

Figure 3:
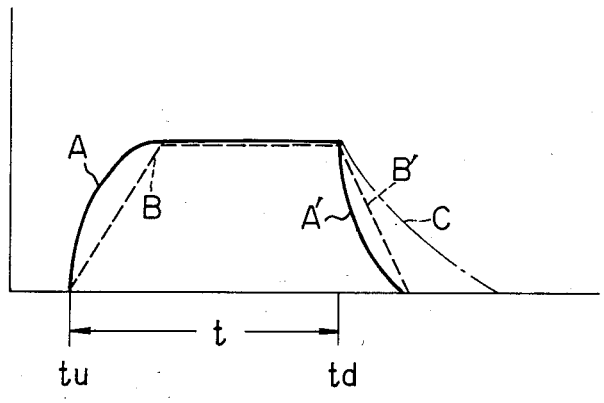
FIG. 3 shows another waveform of a burst signal by which the audible sound is capable of being reduced.

In view of this fact, the present invention provides circuit means for minimizing the audible sound generated during the ultrasonic wave transmission by forming a transient curve as shown by dashed lines B and B' in FIG. 3. Such circuit means will be described below with reference to an embodiment shown in FIG. 4.

Figure 4:
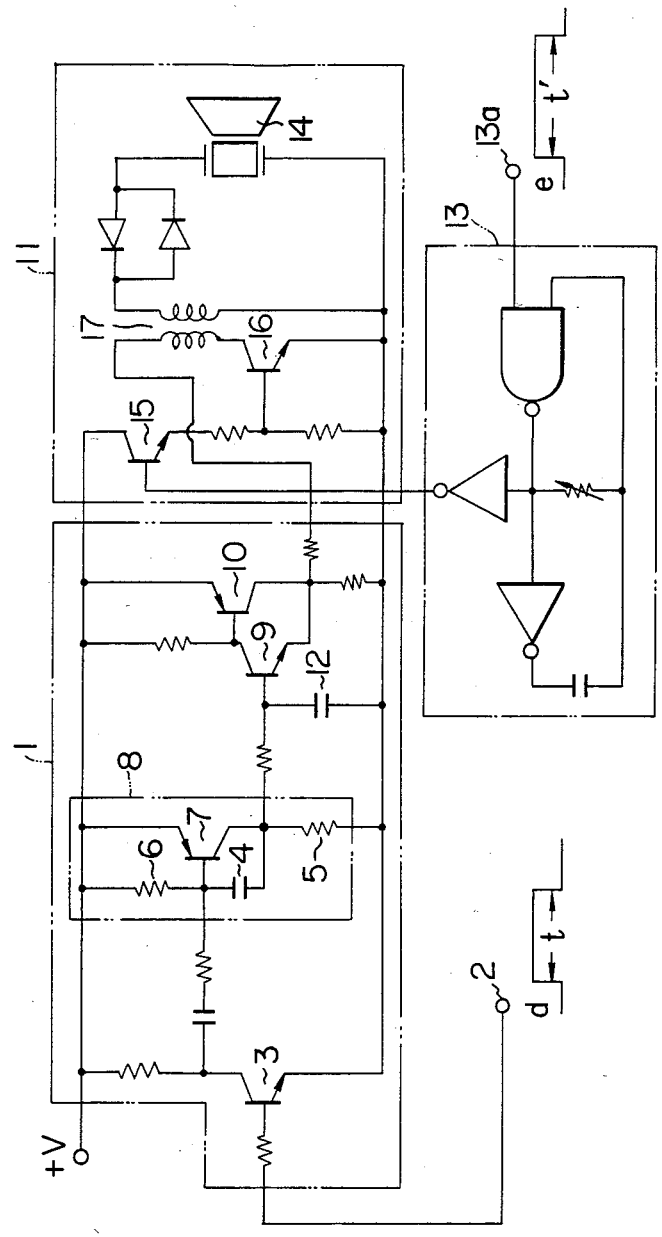
FIG. 4 is a partial circuit diagram showing an ultrasonic distance measuring apparatus according to an embodiment of the present invention.

A partial circuit diagram of an embodiment of the ultrasonic wave distance measuring apparatus according to the present invention is shown in FIG. 4. In FIG. 4, reference numeral 1 designates a waveform shaping circuit, numeral 11 an ultrasonic wave transmission circuit, and numeral 13 a burst signal oscillator circuit.

Assume that the terminal 2 of the waveform shaping circuit 1 is impressed with a gate signal d for substantially defining the transmission period of the ultrasonic wave through a certain circuit means not shown. The transistor 3 begins to conduct. With the conduction of the transistor 3, a Miller integrator circuit 8 including a capacitor 4, resistors 5, 6 and a transistor 7 in the next stage is enabled thereby to gradually increase the base voltage of the transistor 9 in the next stage.

As a result, a transistor 10 for power amplification in the next stage is also actuated following the transistor 9, so that the power waveform applied to the ultrasonic transmission circuit 11 takes a rise waveform B shown in FIG. 3.

When the gate signal d is turned off after the lapse of a predetermined time interval t, the transistor 3 that has thus far been on is turned off and the capacitor 4 of the Miller integrator circuit 8 begins to be charged. The base potential of the transistor 7 begins to slowly increase thereby to urge the transistor 7 slowly in the direction of nonconduction.

The base potential of the transistor 9 thus begins to slowly decrease and, at the same time, the charge of the capacitor 12 begins to be discharged through the resistor 5, with the result that the operation of the cascaded transistcor 10 is controlled thereby to produce a fall waveform B' of FIG. 3.

The capacitor 12 is used effectively to lengthen the fall waveform alone, and permits the generation of a power waveform of a more gentle slope as shown by the one-dot chain C of FIG. 3 by selecting the capacitance value thereof appropriately.

As described above, by generating a fall waveform having a gentle slope, the audible sound is proportionately reduced. In similar fashion, the audible sound is capable of being alleviated of course by producing a more gentle slope of the rise waveform.

If the time required to reach the peak of the rise waveform B is excessively lengthened, however, the resultant delay affects the distance measuring time measured by the ultrasonic wave, thereby causing a distance measurement error. Therefore, the fall waveform alone is preferably controlled to be of a more gentle slope than in prior art.

The input terminal 13a of the burst signal oscillator circuit 13 is supplied with a pulse signal e synchronous with the gate signal d and having a duration t' sufficiently longer than the pulse width t. The oscillator circuit 13 begins to oscillate with the supply of the gate signal d.

Figure 5:
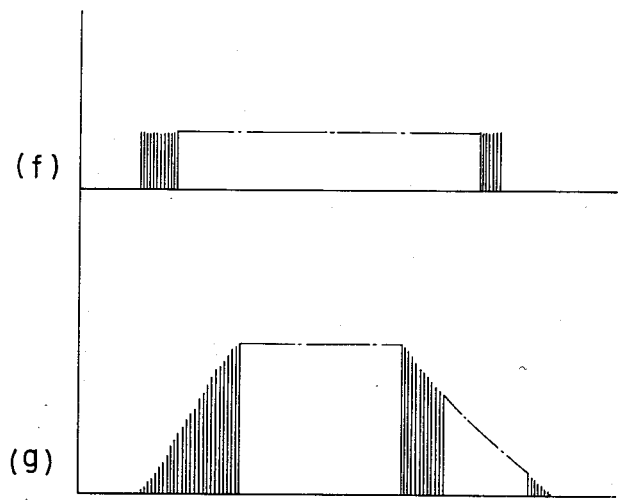
FIG. 5 is a diagram showing an output waveform and a burst signal waveform of a burst signal oscillator circuit 13 included in the embodiment of FIG. 4.

The oscillation frequency of the burst signal oscillator circuit 13, which is equal to the resonance frequency of the ultrasonic transducer 14, is applied to the ultrasonic wave transmission circuit 11 in the form of output oscillation pulses as shown in FIG. 5(f).

The transistors 15 and 16 are turned on and off in accordance with the oscillation pulse signal (f). Since the power waveform produced by the waveform shaping circuit 1 is applied to the collector of the transistor 16 through the primary winding of the boost-up transformer 17, the ultrasonic wave oscillating transducer 14 is supplied with a pulse signal as shown in FIG. 5(g) controlled by both the above-mentioned circuits.

In this way, according to the present invention, the rise and/or fall of the burst signal applied to the ultrasonic wave sensor are controlled to minimize the generation of the audible sound. The Miller integrator circuit used as a waveform shaping circuit means in the foregoing embodiment may be replaced with like effect by another circuit means capable of performing a like operation.

It will be understood from the foregoing description that according to the present invention, there is provided an ultrasonic distance measuring apparatus comprising circuit means for producing a burst signal waveform having rise and/or fall portions of a gentle slope applied to the ultrasonic sensor, whereby the audible sound caused during the transmission of the ultrasonic wave for distance measurement can be reduced or removed. Thus this invention furnishes a very useful practical effect to a television camera or other devices requiring a continuous distance measuring operation.

What is claimed is:

1. An ultrasonic distance measuring apparatus comprising:

an ultrasonic wave transmission circuit including an ultrasonic transducer, a step-up transformer having a primary coil and a secondary coil for driving said transducer to generate an ultrasonic wave, an oscillator circuit for generating an oscillation signal to set a frequency of the ultrasonic wave, first switch means connected between a power supply terminal and said primary coil for controlling the supply of power from a power supply terminal to said primary coil, said first switch means being switched by the oscillation signal of said oscillator circuit in order to control a timing of the supply of electric power from said power supply terminal to said primary coil; and a waveform shaping circuit including second switch means for switching between first and second conditions in response to a control signal which defines a transmission period of the ultrasonic wave, a waveform shaping section for generating an output signal which linearly increases to a predetermined level in response to the first condition of said second switch means and maintains the predetermined level until said second switch means assumes the second condition, and third switch means including a capacitor charged by the output signal of said waveform shaping section and a switching element connected between said power supply terminal and said primary coil and having a controllable electrode supplied with terminal voltage of said capacitor, said third switching means being responsive to the output signal from said waveform shaping section to control the level of the electric power supplied from said power supply terminal to said primary coil so that an ultrasonic wave burst signal having a trapezoidal shape, as determined by said waveform shaping circuit, and a frequency, as determined by said oscillator circuit, is produced by said transducer.

2. An apparatus according to claim 1, wherein said waveform shaping section comprises a Miller integrator circuit.

3. An ultrasonic distance measuring apparatus comprising:

an ultrasonic transducer;

an oscillator for determining the frequency of an ultrasonic wave emitted by said transducer;

first means responsive to the output of said oscillator for controlling a timing of a supply of power to said transducer;

second means responsive to an applied control signal which sets a period of emission of an ultrasonic wave by said transducer, said second means controlling a level of power from said supply of power which is applied to said transducer, said first and second means being serially connected between said supply of power and said transducer, said first and second means operating to produce a burst ultrasonic wave which is emitted by said transducer and which has a frequency determined by said oscillator and a trapezoidal waveform, as determined by said second means in response to said applied control signal.

* * * * *